United States Patent
Wang et al.

(10) Patent No.: US 11,570,659 B2
(45) Date of Patent: Jan. 31, 2023

(54) TECHNIQUES FOR SEARCH SPACE BASED CHANNEL SENSING IN SIDELINK

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/127,673

(22) Filed: Dec. 18, 2020

(65) Prior Publication Data

US 2022/0201546 A1 Jun. 23, 2022

(51) Int. Cl.
| | |
|---|---|
| *H04W 28/02* | (2009.01) |
| *H04W 72/02* | (2009.01) |
| *H04W 24/10* | (2009.01) |
| *H04B 17/318* | (2015.01) |
| *H04W 72/04* | (2009.01) |
| *H04W 92/18* | (2009.01) |

(52) U.S. Cl.
CPC ...... *H04W 28/0289* (2013.01); *H04B 17/318* (2015.01); *H04W 24/10* (2013.01); *H04W 72/02* (2013.01); *H04W 72/0486* (2013.01); *H04W 92/18* (2013.01)

(58) Field of Classification Search
CPC ... H04W 24/10; H04W 28/028; H04W 72/02; H04B 17/318
See application file for complete search history.

(56) References Cited

U.S. PATENT DOCUMENTS

| | | | | |
|---|---|---|---|---|
| 2016/0037494 A1* | 2/2016 | Meng | ............... | H04W 72/042 370/281 |
| 2020/0029245 A1* | 1/2020 | Khoryaev | ........... | H04L 27/0006 |
| 2021/0144726 A1* | 5/2021 | Hui | .............. | H04W 72/085 |
| 2021/0227604 A1* | 7/2021 | Huang | .............. | H04W 72/02 |
| 2021/0243762 A1* | 8/2021 | Selvanesan | ........... | H04L 5/0062 |

FOREIGN PATENT DOCUMENTS

CN WO 2021098126 * 5/2021 ............ H04W 88/04

\* cited by examiner

*Primary Examiner* — Jamal Javaid
*Assistant Examiner* — Ryan C Kavleski
(74) *Attorney, Agent, or Firm* — Arent Fox, LLP

(57) ABSTRACT

Aspects of the present disclosure provide techniques for search space channel sensing in sidelink communication between one or more sensors/actuators (SAs) and programmable logic controller (PLC) in internet of things (IoT) applications. Particularly, the techniques described herein configure a search space (e.g., subset of all available subchannels/resources) for transmission and reception of sidelink packets (e.g., physical sidelink control channel (PSCCH) and physical sidelink shared channel (PSSCH)) between the PLC from the one or more SAs. Thus, in some instances, the UE may perform congestion control metrics for a one or more search spaces in which the UE may transmit sidelink communications. The congestion control metrics that may be limited to the search space may preserve UE resources that would otherwise need to be expended to perform channel sensing on an entire resource pool prior to initiating sidelink communication.

28 Claims, 4 Drawing Sheets

TECHNIQUES FOR SEARCH SPACE BASED CHANNEL SENSING IN SIDELINK

TECHNICAL FIELD

The present disclosure relates to wireless communication systems, and more particularly, to techniques for search space based on channel sensing in sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for search space channel sensing in sidelink communication between one or more sensors/actuators (SAs) and programmable logic controller (PLC) in internet of things (IoT) applications. Particularly, the techniques described herein configure a search space (e.g., subset of all available subchannels) for transmission and reception of sidelink packets (e.g., physical sidelink control channel (PSCCH) and physical sidelink shared channel (PSSCH)) between the PLC from the one or more SAs. Thus, in some instances, the UE may perform congestion control metrics (e.g., calculating channel busy ratio (CBR) or channel occupancy ratio (CR)) for each search space in which the UE may transmit sidelink communications. The congestion control metrics may be restricted to the search space in order to preserve UE resources that would otherwise need to be expended to perform channel sensing on an entire resource pool (e.g., full set of subchannels) prior to initiating sidelink communication.

In one example, a method for wireless communication is disclosed. The method may include configuring, at a first user equipment (UE), a search space for sidelink communication with one or more second UEs, wherein the search space is a subset of resources from a resource pool. The method may further include determining, at the first UE, congestion control metrics for the subset of resources within the configured search space prior to initiating data transmission from the first UE to the one or more second UEs. The method may also include transmitting from the first UE a sidelink data to the one or more second UEs over the subset of resources within the search space based on the congestion control metrics for the subset of subchannels.

In another example, an apparatus for wireless communications. The apparatus may include a memory having instructions and a processor configured to execute the instructions to configure, at a first user equipment (UE), a search space for sidelink communication with one or more second UEs, wherein the search space is a subset of resources from a resource pool. The processor may further be configured to execute the instructions to determine, at the first UE, congestion control metrics for the subset of resources within the configured search space prior to initiating data transmission from the first UE to the one or more second UEs. The processor may further be configured to execute the instructions to transmit from the first UE a sidelink data to the one or more second UEs over the subset of resources within the search space based on the congestion control metrics for the subset of subchannels.

In some aspects, a non-transitory computer readable medium includes instructions stored therein that, when executed by a processor, cause the processor to perform the steps of configuring, at a first user equipment (UE), a search space for sidelink communication with one or more second UEs, wherein the search space is a subset of resources from a resource pool. The processor may further execute the instructions for determining, at the first UE, congestion control metrics for the subset of resources within the configured search space prior to initiating data transmission from the first UE to the one or more second UEs. The processor may further execute the instructions for transmitting from the first UE a sidelink data to the one or more second UEs over the subset of resources within the search space based on the congestion control metrics for the subset of subchannels.

In certain aspects, another apparatus for wireless communication is disclosed. The apparatus may include means for configuring, at a first user equipment (UE), a search space for sidelink communication with one or more second UEs, wherein the search space is a subset of resources from a resource pool. The apparatus may further include means for determining, at the first UE, congestion control metrics for the subset of resources within the configured search space prior to initiating data transmission from the first UE to the one or more second UEs. The apparatus may further include means for transmitting from the first UE a sidelink data to the one or more second UEs over the subset of resources within the search space based on the congestion control metrics for the subset of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
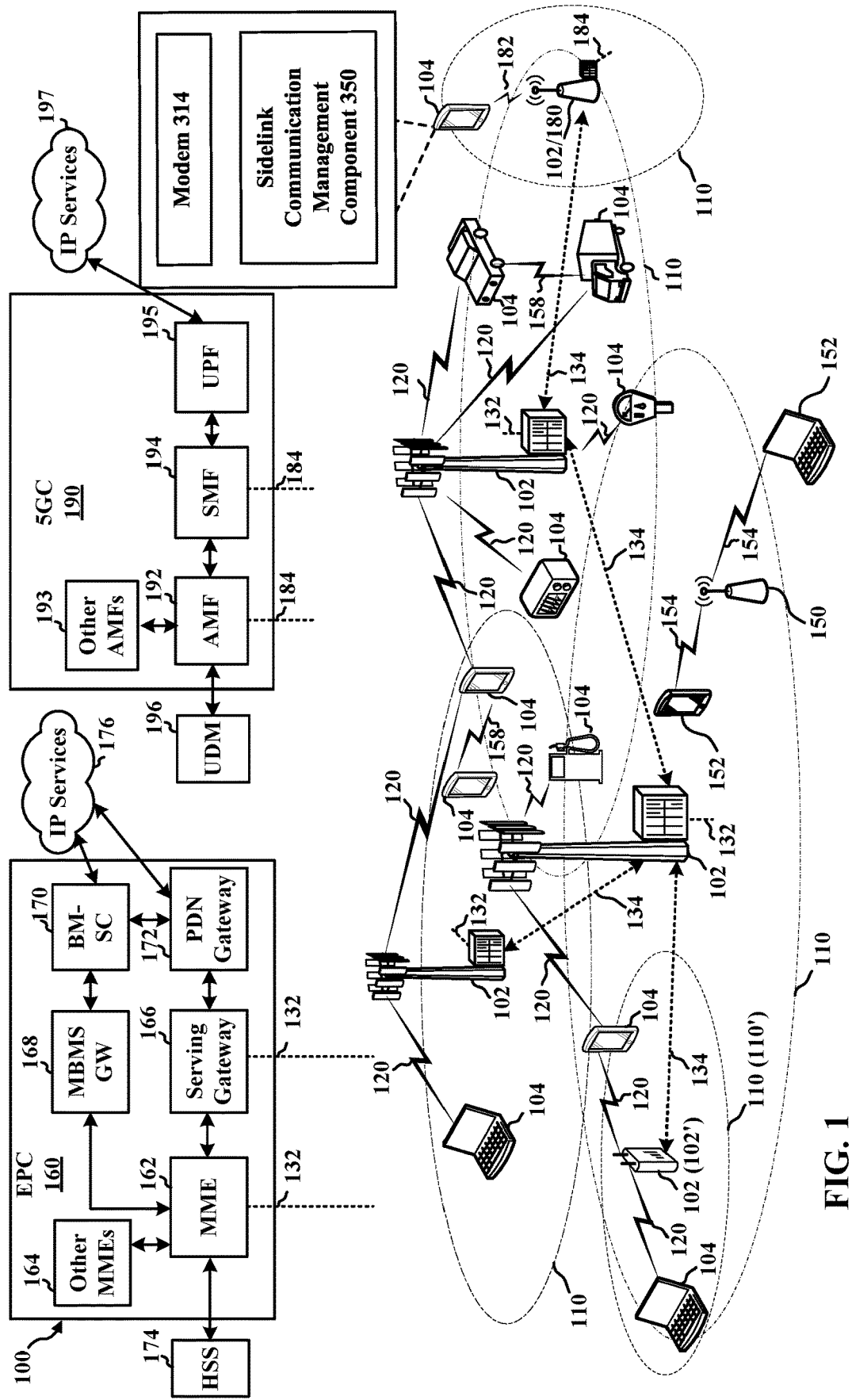
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on functionalities for direct UE to UE communication (which may also be referred to as device-to-device (D2D) or sidelink communication), which allows two nearby devices (e.g., UEs) to communicate with each other in the cellular bandwidth without base station involvement or with limited base station involvement. However, introduction of D2D poses new challenges particularly in inter of thing (IoT) devices.

For example, to transmit data packets without base station intervention, a transmitter UE ("Tx UE") generally performs channel sensing prior to initiating transmission in order to ensure that the channel is not occupied by other communications. Similarly, to receive sidelink packets, a receiver UE ("Rx UE") generally performs blind decoding of all sidelink sub-channels.

Such implementation is possible in cellular vehicle-to-everything (C-V2X) technology where the number of sub-channels is typically small (e.g., 27 sub-channels). The same is not true, however, for all applications of sidelink communications (e.g., IoT devices). Indeed, in IoT applications for instance, sidelink communications can be enabled between direct programmable logic controller (PLC) and a host of sensors/actuators (SAs). For example, a single PLC may control 20-50 SAs located on a robotic arm used for manufacturing. Thus, in contrast to C-V2X, IoT devices have significant number of sub-channels (e.g., 50-100 for IoT). Requiring UEs to perform channel sensing for all the sub-channels prior to transmission of a data packet to another UE (e.g., between PLC and one or more SAs) for D2D communication may be resource intensive. At the receiver end, blind decoding all the sub-channels, as is conducted in conventional sidelink communications applications (e.g., C-V2X), may also exceed UE capabilities.

Additionally, with respect to IoT applications, there may be tight latency (e.g., 1-2 milliseconds) and ultra-reliability requirements (e.g., $10^{-6}$ error rate) for communications between the PLC and the plurality of SAs. Thus, where the PLC is controlling the robotic arm that has 20-50 SAs, even a minor delay in communication may have adverse consequences (e.g., a weld being placed in the wrong location. Coordinating communication between the PLC and the SAs through a base station (gNB) may also adversely impact the latency and reliability as the coordination may require multiple over-the-air (OTA) transmissions between the gNB, PLC, and the one or more SAs.

Finally, IoT traffic may also have smaller packet size (e.g., 32-256 bytes) compared to other communications (e.g., cellular). Thus, the overall bandwidth requirement for IoT may be low (e.g., two resource blocks might be sufficient for many communications). However, SAs may also have constraints on UE capabilities in terms of bandwidth and processing power compared to typical UEs (e.g., smart phones). This is because unlike smart phones, SAs are typically affixed to controlled devices (e.g., robotic arm in above example) and do not require the full capabilities such as user interface, enhanced memory, and processing power due to the limited utilization of the SAs. And while each packet transmitted in IoT may individually be small in size (e.g., 32-256 bytes), the overall bandwidth may be large for IoT with dedicated frequency bands because of the high number of SAs (e.g., 20-50 SAs) that may be controlled by a single controlled PLC. For at least the foregoing reasons, communications for IoT devices (e.g., between PLC and plurality of SAs) may benefit from sidelink communication as opposed to being controlled via a base station that schedules resources between the PLC and the SAs. It should be appreciated that other applications other than IoT may also have such low latency requirements that would benefit from improved sidelink communication.

Aspects of the present disclosure provide techniques for performing channel sensing in sidelink communication between a plurality of UEs based on a configured search space. The term "search space" may correspond to a set of control channel elements (CCEs) in time and/or frequency domain that constitute a control or data region for the one or more UEs that may be allocated. Simply stated, a search space is a location in resource blocks where the receiver UE may search for PSCCH and/or PSSCH (e.g., data packet). The CCE indices in a given configurable control resource set (CORESET) for the PSCCH may be calculated based on a hashing functions. And while the present disclosure is described with reference to PLC and SAs, it should be appreciated that the techniques can be implemented on any UEs. Indeed, the PLC and/or SAs are individual UEs that may communicate with each other on a sidelink channel.

Accordingly, aspects of the present disclosure provide techniques for calculating congestion control metrics (e.g., channel sensing) based in part on the search space (e.g., subset of all subchannels) as opposed to a complete resource pool (e.g., full set of subchannels). To this end, the UE may calculate channel busy ratio (CBR) or channel occupancy ratio (CR) for one or more search space(s) in which the UE may transmit sidelink communications. The determination of the congestion control metrics may dictate the resources on which the first UE transmits sidelink communication to a second UE. In some examples, the CR search space (CR_SS) and/or CBR search space (CBR_SS) for any particular search space from a plurality of search spaces may be calculated at n slot based on following equation:

$$CR_{SS,TX}(n, k, i) = \frac{UsedTxSubcSS(n-a, n-1) + GrantedTxSubcSS(n, n+b)}{TotalSubcSS(n-a, n+b)}.$$ Equation 1

The CR evaluated at slot n in the above Equation 1 may be defined as the total number of sub-channels used for its transmissions in slots [n–a, n–1] and granted in slots [n, n+b] divided by the total number of configured sub-channels in the transmission pool over [n–a, n+b], where a may be a positive integer and b may be 0 or a positive integer. Thus, in some aspects, the n may refer to the slot index, k may refer to the priority of the traffic, and i may be the search space index.

In some examples, the Tx UE may utilize the CR and/or CBR measurements for one or more search spaces for congestion control for sidelink communication. Specifically, once the Tx UE calculates CR and/or CBR prior to initiating a sidelink transmission to the Rx UE, the Tx UE may determine whether the CR and/or CBR exceeds a predetermined limit for CR/CBR. If the Tx UE determines that the calculated CR and/or CBR in search space from a plurality of search space is less than the predetermined limit for CR/CBR, the Tx UE may transmit the sidelink packets to the Rx UE in the selected search space from a plurality of search spaces. Additionally or alternatively, the Tx UE may also calculate an average or sum CR of the plurality of search spaces from a resource pool. In such instance, the Tx UE may ensure that CR/CBR for a particular search space is less than a first predetermined limit for each search space and, at the same time, less than a second predetermined limit associated with the average or sum CR of the plurality of search spaces. Thus, the Tx UE may select a search space from a plurality of search spaces for transmission of sidelink packets based on the calculated CR/CBR for one or more search spaces and the average/sum of the plurality of search spaces collectively.

The congestion control metrics may also be based on the occupied (i.e., usedTxSubcSS) and granted (i.e., GrantedTxSubcSS) subchannels in the search space. Specifically, the Rx UE may monitor the search space and perform blind decoding in the configured search space in order to minimize the resources that are expended for decoding sidelink communications in a plurality of subchannels (e.g., in either resource pool). The Rx UE may also measure the "capacity" of the search space by performing congestion control metrics (e.g., CR and CBR) in order to aid in sidelink communication. The CR and/or CBR may be measured by the Rx UE and information may be feedback to the Tx UE for improved resource selection by the Tx UE. In some aspects, the Rx UE congestion control metrics may be measured based on the following equation:

$$CR_{SS,RX}(n, k, i) = \frac{UsedSubcSS(n-a, n-1) + ReservedSubcSS(n, n+b)}{TotalSubcSS(n-a, n+b)}.$$ Equation 2

As noted above, the congestion control metrics performed by the Rx UE may be useful for the Tx UE to perform channel sensing and select bandwidth resources for transmission of one or more data packets in sidelink communication to Rx UE. In some aspects, the CR and/or CBR measured by Rx UE may be different from the CR and/or CBR measured by the Tx UE. As such, the Tx UE may utilize the receiver side CR and/or CBR to optimize channel sensing and resource selection.

In some situations, as noted above, the PLC and one or more SAs may have different UE capabilities. For example, the PLC may include more processing capability in order communication with a plurality of SAs. In contrast, SAs may have constraints on UE capabilities in terms of bandwidth and processing power compared to typical UEs (e.g., smart phones) and PLC(s). In such situations, the PLC may assist the SA for sidelink communication (e.g., when the SA is transmitting to the PLC) by communicating the resource occupancy and congestion control metric information to the one or more SAs.

Thus, in some aspects, a first anchor UE (e.g., PLC) may monitor traffic from a plurality of client UEs (e.g., one or more SAs) and one or more second anchor UEs (e.g., second anchor UE) and store resource reservation information associated with each of the plurality of UEs (SAs and/or PLCs) within the coverage of the first anchor UE (e.g., first PLC). In other words, as SAs make resource reservations for the channel, the anchor UE may utilize the resource reservation information gathered from one or more client UEs in order to aid one or more SAs in selection of resources that have not been reserved by other clients. The anchor UE may broadcast anchor assistance information that includes resource reservation information to all clients (e.g., one or more SAs or other PLC) of the anchor UE.

In some examples, the anchor assistance information may include one or more of measurements in the SS (e.g., RX's CR/CBR, RSRP, RSSI, etc.), or sensing space configuration based on resource reservation and collision information at the Rx UE. Because channel sensing and resource selection is more efficient based on Rx UE measurement information rather than information collected by Tx UE alone, a UE (e.g., Tx UE) may forego performing channel sensing if anchor UE provides channel sensing information, including but not limited to CBR/CR measurement information and/or resource reservation information. Information sharing may also provide power saving at UEs because if Rx UE associated CR in a first search space is high, Tx UE may skip performing channel sensing in the first search space and, instead switch to performing channel sensing in a search space.

In some aspects, the signaling associated with anchor-assisted sensing information to clients may be periodic transmission (e.g., in every 32 slots). In some instances, assistance information may be either transmitted or multiplexed in PSSCH (or SCI), and may be groupcast or broadcast to a plurality of UEs depending on the payload size. Indication of the anchor-assisted sensing information may be communicated in SCI 1 or SCI 2 (e.g., special group-ID) indicating to the one or more UEs that PSSCH contains the anchor-assisted sensing information (e.g., SCI2 format or CRC scrambling sequence or special SCI1 fields combinations). The client UEs (e.g., SAs) may also be informed about the anchor-assisted sensing information by periodic and aperiodic occasions by higher layers (e.g., periodicity for periodic transmission and subchannel index and slots for aperiodic transmission). In turn, the client UEs may perform channel sensing in a search space based in part on the received anchor assistance information from an anchor UE. Thus, in some aspect where a UE receives anchor-assisted sensing information, the Tx UE may forgo performing its own channel sensing in reserved resources or transit in a subchannel if congestion control metrics indicates low RSRP.

In some aspects, the anchor provided resource usage information from a first anchor UE (e.g., a first PLC) may also be beneficial to one or more second anchor UEs (e.g., second PLCs) where an anchor-to-anchor link may be blocked. In such instance, client UE (e.g., SAs) may be able to decode such information received from a first anchor UE and relay the information to the second anchor UE. A client may be configured by the serving anchor a search space for monitoring another anchor's activity.

Anchor UEs may know the search space from higher layer or from other anchors or gNB. Thus, a client may "discover" another anchor's message in a global common search space and the client may report its RF measurements (CR/CBR, RSSI, etc.) for search space.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 514 and a sidelink communication management component 350 (see FIG. 3) to configure a search space based channel sensing for sidelink communications between a plurality of UEs. In some aspects, the UE 104 may function as PLC or SA in an IoT application. The sidelink communication management component 350, when operating as a PLC, may perform congestion control metrics (e.g., calculating channel busy ratio (CBR) or channel occupancy ratio (CR)) for each search space in which the UE may transmit sidelink communications. The congestion control metrics that may be limited to the search space may preserve UE resources that would otherwise need to be expended to perform channel sensing on an entire resource pool (e.g., full set of subchannels) prior to initiating sidelink communication.

In some aspects, the sidelink communication management component 350 may also function as an anchor UE when the UE 104 is a PLC. In such instance, the sidelink communication management component 350 may monitor traffic from a plurality of client UEs (e.g., SAs) and other anchors (e.g., second anchor UE) and store resource reservation information associated with each of the plurality of UEs within the coverage of the anchor UE. The anchor UE may broadcast anchor assistance information that includes resource reservation information to all clients (e.g., one or more SAs or other PLC) of the anchor UE. In such situations, the PLC may assist the one or more SAs for sidelink communication (e.g., when the SA is transmitting to the PLC) by communicating the resource occupancy and congestion control metric information to the one or more SAs.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
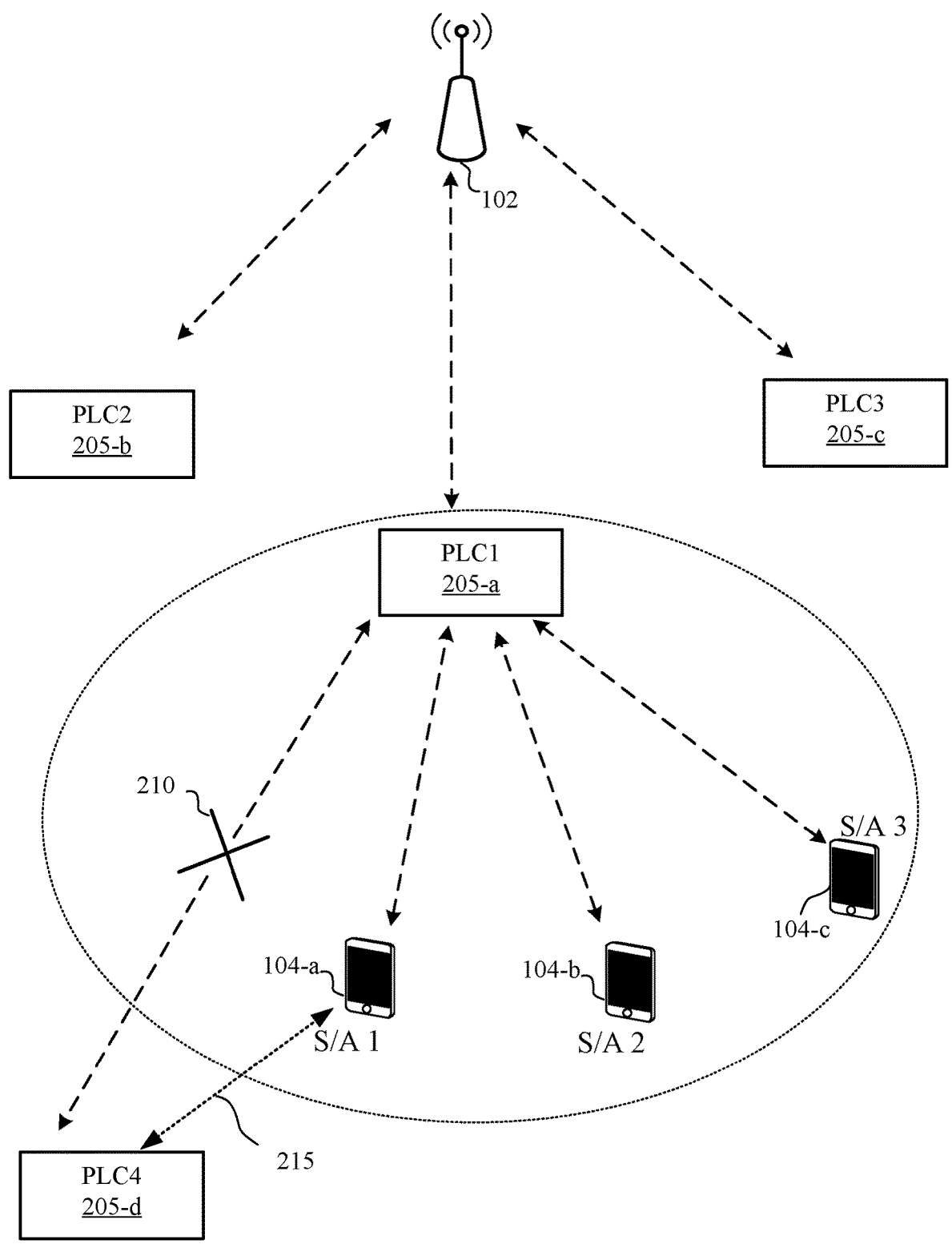
FIG. 2 is a schematic diagram of an example of a wireless communication system implementing search space based channel sensing in sidelink communication with aspects of the present disclosure.

FIG. 2 is a schematic diagram 200 of an example of a wireless communication system implementing search space based channel sensing in sidelink communication with aspects of the present disclosure. The schematic diagram 200 illustrates an example of programmable logic controller (PLC) 205, and may include one or more UEs 104 that may be examples of sensors/actuators (SAs) discussed above. In some instances, the PLC 205 may be a gNB 102 or a UE 104 that is operating as a controller in IoT devices or other sidelink applications. When operating as a UE 104, the PLC 205 may include gNB functionalities that may include, for example, configuring search spaces and allocating resources to one or more SAs/UEs 104.

Thus, in some examples, there may be two modes of resource allocations. In first mode (Mode 1), the base station 102 may assign Tx resources for sidelink communications through downlink control information (DCI) messages. In the second mode (Mode 2), the transmitting UEs (Tx UE) may autonomously select resources for sidelink communication. Particularly, the Tx UE may perform channel sensing by blindly decoding all PSCCH channels and finding out the reserved resources by other sidelink transmissions. Tx may then report available resources to upper layer that selects resource usage for sidelink communication. In both instances, the Rx UE operation may be the same.

As noted above, in the IoT applications for instance, sidelink communications can be enabled between direct PLC 205 and a host of sensors/actuators (also referred hereto as UEs 104). In some examples, the UEs 104 operating as sensors/actuators may be reduced capability UEs 104 than traditional smart phones or may be configured with hardware specific for various applications (e.g., additional sensors etc.) A single PLC 205 may control 20-50 SAs or UEs 104 (e.g., first UE 104-a, second UE 104-b, and third UE 104-c). Because of the implementation of IoT applications, there may be tight latency (e.g., 1-2 milliseconds) and ultra-reliability requirements (e.g., $10^{-6}$ error rate) for communications between the PLC 204 and the plurality of SAs/UEs 104.

In some aspects, IoT traffic may be smaller packet size (e.g., 32-256 bytes) compared to other communications (e.g., cellular). Thus, the overall bandwidth requirement for IoT may be low (e.g., two resource blocks might be sufficient for many communications). Additionally, applications for sidelink communication in IoT application may have significant number of sub-channels (e.g., 50-100) in comparison to, for example, C-V2X applications. Thus, blind decoding all the sub-channels, as is conducted in conventional sidelink communications for applications such as C-V2X, may exceed UE capabilities and adversely impact the latency and reliability constraints.

To this end, aspects of the present disclosure provide techniques for UEs (e.g., PLC 205 and/or S/A 104) to calculating CBR or CR for one or more search space(s) in which the UE may transmit sidelink traffic. The congestion control metrics that may be limited to the search space may preserve UE resources that would otherwise need to be expended to perform channel sensing on an entire resource pool (e.g., full set of subchannels) prior to initiating sidelink communication.

Aspects of the present disclosure provide techniques for configuring congestion control metrics (e.g., channel sensing) based on the search space (e.g., subset of all subchannels) as opposed to a complete resource pool (e.g., full set of subchannels).

In some situations, due to hardware constraints of one or more UEs (e.g., SA 104 in comparison to PLC 205), the PLC 205 may assist the one or more SAs 104 with resource selection and channel sensing by communicating the resource occupancy and congestion control metric information to the one or more SAs 104. Thus, in some aspects, a first anchor UE 205-b (e.g., PLC) may monitor traffic from a plurality of client UEs (e.g., first SA 104-a, second SA 104-b, and third SA 104-c) and one or more second anchor UEs (e.g., second PLC 205-b, third PLC 205-c) and the store resource reservation information associated with each of the plurality of UEs (PLCs 205 and SAs 104). Stated differently, as UEs (e.g., PLCs 205 and SAs 104) make resource reservations for a channel, the first anchor UE 205-a may utilize the resource reservation information gathered from one or more client UEs (e.g., PLCs 205 and SAs 104) in order to aid one or more SAs 104 in selection of resources that have not been reserved by other UEs in the network or surrounding network (e.g., network associated with the second PLC 205-b that may have separate set of SAs 104 that may impact interference at the first network associated with first PLC 205-a). The first anchor UE 205-a may broadcast anchor assistance information that includes resource reservation information to all UEs (e.g., PLCs 205 and SAs 104).

As noted above, the anchor assistance information may include one or more of measurements in the SS (e.g., RX's CR/CBR, RSRP, RSSI, etc.), or sensing space configuration based on resource reservation and collision information at the Rx UE. Because channel sensing and resource selection is more efficient based on Rx UE measurement information rather than information collected by Tx UE alone, a UE (e.g., Tx UE) may forego performing channel sensing if anchor UE provides channel sensing information, including but not limited to CBR/CR measurement information and/or resource reservation information. Information sharing may also provide power saving at UEs because if Rx UE associated CR in a first search space is high, Tx UE may skip performing channel sensing in the first search space and, instead switch to performing channel sensing in a search space.

In some aspects, the signaling associated with anchor-assisted sensing information to clients may be periodic transmission (e.g., in every 32 slots). In some instances, assistance information may be either transmitted or multiplexed in PSSCH (or SCI), and may be groupcast or broadcast to a plurality of UEs depending on the payload size. Indication of the anchor-assisted sensing information may be communicated in SCI 1 or SCI 2 (e.g., special group-ID) indicating to the one or more UEs that PSSCH contains the anchor-assisted sensing information (e.g., SCI2 format or CRC scrambling sequence or special SCI1 fields combinations). The client UEs (e.g., PLCs 205 and SAs 104) may also be informed about the anchor-assisted sensing information by periodic and aperiodic occasions by higher layers (e.g., periodicity for periodic transmission and subchannel index and slots for aperiodic transmission). In turn, the client UEs (e.g., PLCs 205 and SAs 104) may perform channel sensing in a search space based in part on the received anchor assistance information from an anchor UE. Thus, in some aspect where a UE receives anchor-assisted sensing information, the Tx UE may forgo performing its own channel sensing in reserved resources or transit in a subchannel if congestion control metrics indicates low RSRP.

In some aspects, the anchor provided resource usage information from a first anchor UE (e.g., a first PLC 205-*a*) may also be beneficial to one or more second anchor UEs (e.g., PLCs 205-*d*) where an anchor-to-anchor link 210 may be blocked. In such instance, one or more SAs (e.g., first SA 104-*a*) may decode resource usage information received from the first PLC 205-*a* and relay the resource usage information to the second anchor UE (e.g., PLC 205-*d*). Anchor UEs may include information regarding the search space from higher layer or from other anchors or gNB 102. Thus, a client UE (e.g., SA 104) may "discover" another anchor's message in a global common search space and the client may report its RF measurements (CR/CBR, RSSI, etc.) for search space.

Specifically, a SA 104-*a*, for instance, may decode the broadcast information transmitted by a first anchor UE (e.g., PLC1 205-*a*) and relay the decoded message to the second anchor UE (e.g., PLC4 205-*d*) or vice versa. In one instance, the SA 104-*a* may decode the PSSCH carrying the anchor-assistance information and forward the resource indication message to the second anchor UE e.g., PLC4 205-*d*), including the first anchor UE ID information. In another instance, the SA 104-*a* may not decode the PSSCH. Instead, the SA 104-*a* may simply relay the PSSCH upon SCI indication of assistance message from other anchor UEs without decoding the PSSCH itself.

In some aspects, the anchor UEs (e.g., PLC1 205-*a* or PLC4 205-*d*) may perform resource selection/scheduling of communication based on the assistance information feedback received from SAs 104. This is because in some scenarios, the SAs (e.g., SA 104-*a*) may detect signal interference from a second anchor UE (e.g., PLC4 205-*d*) in one or more subchannels. Based on the feedback information received from the SA 104-*a*, the first anchor UE (e.g., PLC 205-*a*) may avoid transmission in subchannels that are experiencing interference at the SA 104.

Figure 3:
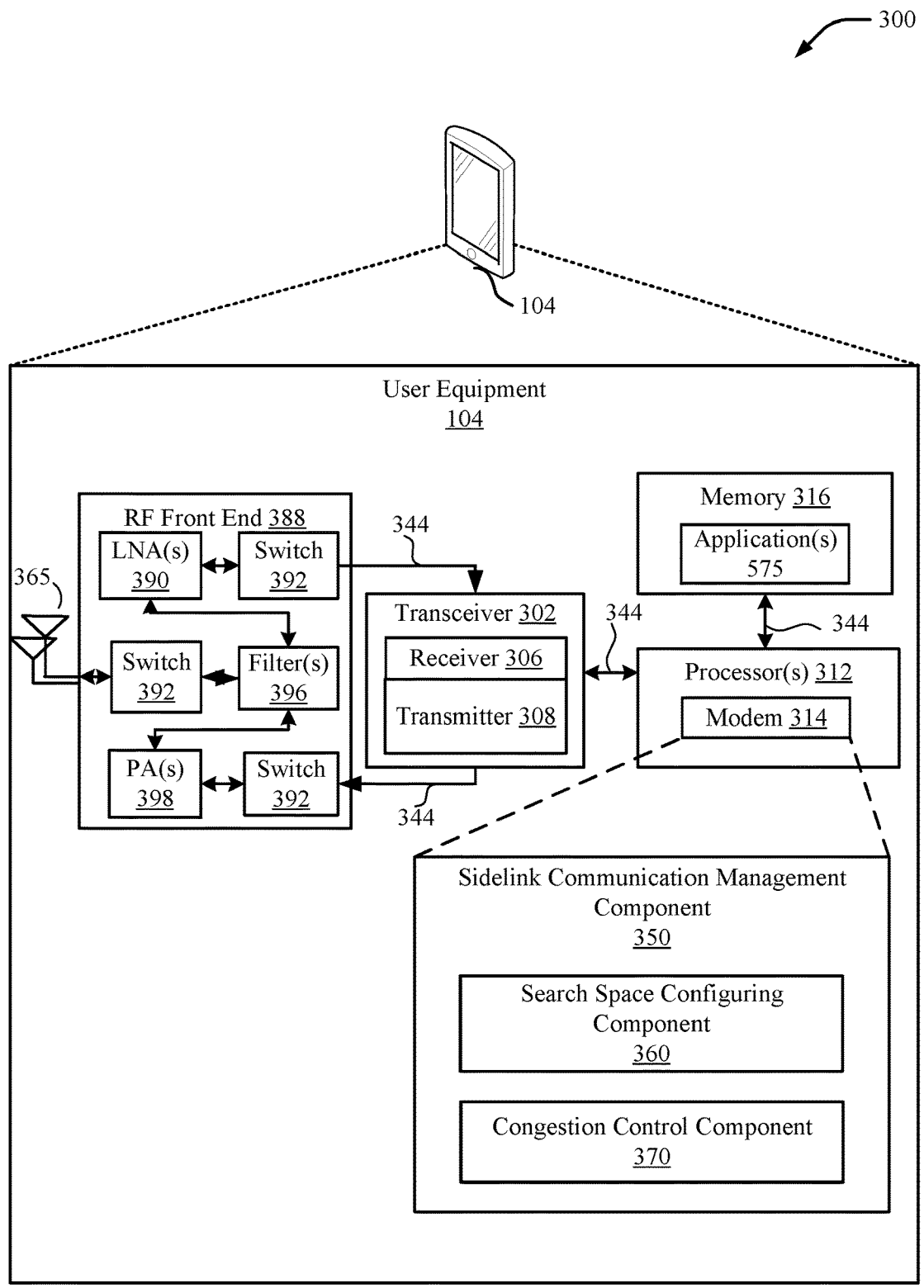
FIG. 3 is a schematic diagram of an example implementation of various components of a user equipment in accordance with various aspects of the present disclosure.

FIG. 3 illustrates hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the sidelink communication management component 350 to perform functions described herein related to including one or more methods (e.g., 400) of the present disclosure.

In some aspects, the sidelink communication management component 350 may configure a search space based channel sensing for sidelink communications between a plurality of UEs. The sidelink communication management component 350, when operating as a PLC may perform congestion control metrics (e.g., calculating channel busy ratio (CBR) or channel occupancy ratio (CR)) for each search space in which the UE may transmit sidelink communications. The congestion control metrics that may be limited to the search space may preserve UE resources that would otherwise need to be expended to perform channel sensing on an entire resource pool (e.g., full set of sub channels) prior to initiating sidelink communication.

In other examples, the UE 104, when operating as one of the SAs associated with the PLC may configure the sidelink communication management component 350 to receive the search space configuration information from the PLC UE. The UE 104 may accordingly transmit in the reverse sidelink direction to the PLC sidelink traffic over the allocated subchannels based on the configuration information.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to sidelink communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with sidelink communication management component 350 may be performed by transceiver 302.

The memory 316 may be configured to store data used herein and/or local versions of application(s) 375 or sidelink communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining sidelink communication management component 350 and/or one or more of its subcomponents, and/or data associated therewith, when the UE 104 is operating at least one processor 312 to execute sidelink communication management component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104.

The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 588. In an aspect, the transceiver 302 may be tuned to operate at specified frequencies such that transmitting device can communicate with, for example, one or more base stations 102 or one or more cells associated with one or more base stations 102 or other UEs 104. In an aspect, for example, the modem 314 can configure the transceiver 502 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
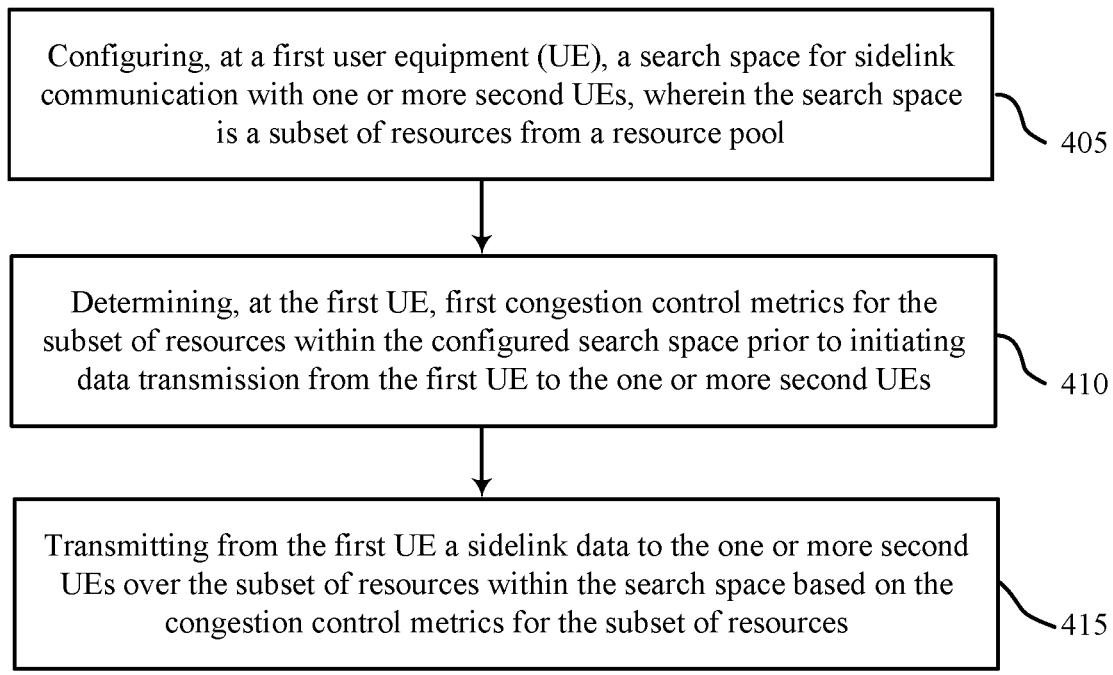
FIG. 4 is a flow diagram of an example of a method of wireless communication implemented by the UE such as a PLC and/or SA in accordance with aspects of the present disclosure.

Referring to FIG. 4, an example method 400 for wireless communications in accordance with aspects of the present disclosure may be performed by one or more UEs 104 (e.g., PLC) discussed with reference to FIGS. 1 and 2. Although the method 400 is described below with respect to the elements of the UE 104, other components may be used to implement one or more of the steps described herein.

At block 405, the method 400 may include configuring, at a first user equipment (UE), a search space for sidelink communication with one or more second UEs, wherein the search space is a subset of resources from a resource pool. In some aspects, configuring the search space for reception of the sidelink data to be transmitted from the one or more second UEs may comprise configuring one of a reverse sidelink common search space (RSL-CSS), reverse sidelink group common search space (RSL-Group-CSS), or a reverse sidelink UE-specific search space (RSL-USS) for the sidelink transmissions from the one or more second UEs. Particularly, configuring a reverse sidelink common search space (RSL-CSS) may indicate to the one or more second UEs that the first UE is monitoring the RSL-CSS for the sidelink transmissions from each of the one or more second UEs. Additionally or alternatively, configuring a reverse sidelink group common search space (RSL-Group-CSS) may indicate to the one or more second UEs that the first UE is monitoring the RSL-Group-CSS for the sidelink transmissions from a subset of the one or more second UEs.

Aspects of block 405 may be performed by the sidelink communication management component 305, and more particularly the search space configuring component 360 as described with reference to FIG. 3. Thus, sidelink communication management component 350, the search space configuring component 360, modem 314, processor 312, and/or the UE 104 or one of its subcomponents may define the means for configuring, at a first user equipment (UE), a search space for sidelink communication with one or more second UEs, wherein the search space is a subset of subchannels from a resource pool of sub channels.

At block 410, the method 400 may include determining, at the first UE, a first congestion control metrics for the subset of resources within the configured search space prior to initiating data transmission from the first UE to the one or more second UEs. In some aspects, the first UE may also receive a second congestion control metrics for the subset of resources within the configured search space that are measured by the second UE. In such instance, the method may include selecting resources within the subset of resources based in part on one or both of the first congestion control metrics measured by the first UE or the second congestion control metrics measured by the second UE.

In some examples, determining the first congestion control metrics for the subset of resources may comprise determining the first congestion control metric for a first search space from a plurality of search spaces that the first UE is configured for sidelink communication. The method may also include determining a second congestion control metric for a second search space from the plurality of search spaces that the first UE is configured for sidelink communication.

In other examples, determining the first congestion control metrics for the subset of resources may comprise determining the first congestion control metric for a first search space from a plurality of search spaces that the first UE is configured for sidelink communication. The method may also comprise determining an average congestion control metric for a plurality of second search spaces from the plurality of search spaces that the first UE is configured for sidelink communication.

In some examples, the first and/or second congestion control metrics may be one or both of calculating channel busy ratio (CBR) or channel occupancy ratio (CR) for each search space in which the UE may transmit sidelink communications. Determining the first congestion control metrics for the subset of resources may also comprise determining the search space associated with the one or more second UE, and performing channel sensing for the subset of resources within the configured search space that overlap at least partially the search space associated with second UE. In other words, the search spaces configured for first UE may include one or more resources that are same as configured search spaces associated with the second UE. In such situation, the method may comprise receiving search space configuration information from the one or more second UEs and identifying the subset of resources to perform channel sensing based in part on the received search space configuration information.

In some aspects, determining the first congestion control metrics for the subset of resources may comprise receiving, at the first UE, resource information (e.g., client-assisted resource information) that originates at a third UE (e.g., another anchor UE such as PLC4 205-*d* in FIG. 2) and is relayed to the first UE (e.g., PLC1 205-*a* in FIG. 2) via the one or more second UEs (e.g., SAs 104). The resource information may be used by the first UE in resource selection for transmitting from the first UE the sidelink data to the one or more second UEs.

In some aspects, the first UE (e.g., PLC1 205-*a* in FIG. 2) may configure the one or more second UEs (e.g., SAs 104) to monitor one or more search spaces associated with a third UE (e.g., another anchor UE such as PLC4 205-*d* in FIG. 2). The one or more second UEs may forward the resource information utilized by the third UE to the first UE upon detection of any signals from the third UE.

In some aspects, determining the first congestion control metrics for the subset of resources comprises determining the search space associated with the one or more second UE, and performing channel sensing for the subset of subchannels that is different from the search space associated with the one or more second UE. Aspects of block 410 may be performed by congestion control component 370 described with reference to FIG. 3. Thus, sidelink communication management component 350, the congestion control component 370, transceiver 302, one or more antennas 365, processor 312, and/or the UE 104 or one of its subcomponents may define the means for determining, at the first UE, a first congestion control metrics for the subset of subchannels within the configured search space prior to initiating data transmission from the first UE to the one or more second UEs.

At block 415, the method 400 may include transmitting from the first UE a sidelink data to the one or more second UEs over the subset of subchannels within the search space based on the first congestion control metrics for the subset of subchannels.

Transmitting from the first UE a sidelink data to the one or more second UEs may comprise receiving, at the first UE, anchor-assisted sensing information from at least one anchor UE to assist the first UE in resource selection for transmitting from the first UE the sidelink data to the one or more second UEs comprises. The anchor assistance information may include one or more of channel measurements of the search space, receiver UE congestion control metrics, reference signal received power (RSRP), or received signal strength indicator (RSSI). In some aspects, the anchor-assisted sensing information is received at the first UE during periodic transmission as a groupcast message. In other examples, the anchor-assisted sensing information is received at the first UE during aperiodic transmission based on changes that exceed a threshold for congestion control metrics for the subset of subchannels.

Aspects of block 415 may be performed by sidelink communication management component 350 described with reference to FIG. 3 in conjunction with the transceiver 302. Particularly, the one or more antennas 365 of the UE 104 may transmit signals received at the UE 104 from the transceiver 302. Thus, sidelink communication management component 350, transceiver 302, one or more antennas 365, processor 312, and/or the UE 104 or one of its subcomponents may define the means for transmitting from the first UE a sidelink data to the one or more second UEs over the subset of subchannels within the search space based on the first congestion control metrics for the sub set of sub channels.

Some Further Example Clauses

Additional examples are described in the following numbered clauses:

1. A method for wireless communications, comprising:
    configuring, at a first user equipment (UE), a search space for sidelink communication with one or more second UEs, wherein the search space is a subset of resources from a resource pool;
    determining, at the first UE, a first congestion control metrics for the subset of resources within the configured search space prior to initiating data transmission from the first UE to the one or more second UEs; and
    transmitting from the first UE a sidelink data to the one or more second UEs over the subset of resources within the search space based on the first congestion control metrics for the subset of resources.

2. The method of clause 1, further comprising:
    receiving, at the first UE, a second congestion control metrics for the subset of resources within the configured search space that are measured by the one or more second UE; and
    selecting resources within the subset of resources based in part on one or both of the first congestion control metrics measured by the first UE or the second congestion control metrics measured by the one or more second UE.

3. The method of any of clauses 1 or 2, wherein the first congestion control metrics is one or both of calculating channel busy ratio (CBR) or channel occupancy ratio (CR) for each search space in which the UE may transmit sidelink communications.

4. The method of any of clauses 1-3, wherein determining the first congestion control metrics for the subset of resources within the configured search space prior to initiating data transmission from the first UE to the one or more second UEs comprises:
    determining the first congestion control metric for a first search space from a plurality of search spaces that the first UE is configured for sidelink communication; and
    determining a second congestion control metric for a second search space from the plurality of search spaces that the first UE is configured for sidelink communication.

5. The method of any of clauses 1-4, wherein determining the first congestion control metrics for the subset of resources within the configured search space prior to initiating data transmission from the first UE to the one or more second UEs comprises:

determining the first congestion control metric for a first search space from a plurality of search spaces that the first UE is configured for sidelink communication; and determining an average congestion control metric for a plurality of second search spaces from the plurality of search spaces that the first UE is configured for sidelink communication.

6. The method of any of clauses 1-5, wherein determining the first congestion control metrics for the subset of resources comprises:

determining the search space associated with the one or more second UE; and performing channel sensing for the subset of resources within the one or more search spaces configured for the first UE that overlap at least partially the search space associated with the second UE.

7. method of any of clauses 1-6, wherein determining the search space associated with the one or more second UE comprises:

receiving search space configuration information from the one or more second UEs; and identifying the subset of resources to perform channel sensing based in part on the received search space configuration information.

8. The method of any of clauses 1-5, wherein determining the first congestion control metrics for the subset of resources comprises:

determining the search space associated with the one or more second UE; and performing channel sensing for the subset of resources that is different from the search space associated with the one or more second UE.

9. The method of any of clauses 1-8, wherein transmitting from the first UE a sidelink data to the one or more second UEs comprises:

receiving, at the first UE, anchor-assisted sensing information from at least one anchor UE to assist the first UE in resource selection for transmitting from the first UE the sidelink data to the one or more second UEs comprises.

10. The method of any of clauses 1-9, wherein anchor assistance information includes one or more of channel measurements of the search space, receiver UE congestion control metrics, reference signal received power (RSRP), or received signal strength indicator (RSSI).

11. The method of any of clauses 1-10, wherein the anchor-assisted sensing information is received at the first UE during periodic transmission as a groupcast message.

12. The method of any of clauses 1-11, wherein the anchor-assisted sensing information is received at the first UE during aperiodic transmission based on changes that exceed a threshold for congestion control metrics for the subset of subchannels.

13. The method of any of clauses 1-12, wherein determining the first congestion control metrics for the subset of resources within the configured search space prior to initiating data transmission from the first UE to the one or more second UEs comprises:

receiving, at the first UE, resource information that originates at a third UE and is relayed to the first UE via the one or more second UEs, wherein the resource information is used by the first UE in resource selection for transmitting from the first UE the sidelink data to the one or more second UEs.

14. The method of any of clauses 1-13, wherein receiving the resource information via the one or more second UEs comprises:

configuring the one or more second UEs to monitor one or more search spaces associated with a third UE, wherein the one or more second UEs forward the resource information utilized by the third UE to the first UE upon detection of any signals from the third UE.

15. An apparatus for wireless communications, comprising:

at least one processor;

and memory coupled to the at least one processor, the memory including instructions executable by the at least one processor to cause the apparatus to:

configure, at a first user equipment (UE), a search space for sidelink communication with one or more second UEs, wherein the search space is a subset of resources from a resource pool;

determine, at the first UE, a first congestion control metrics for the subset of resources within the configured search space prior to initiating data transmission from the first UE to the one or more second UEs; and transmit from the first UE a sidelink data to the one or more second UEs over the subset of resources within the search space based on the first congestion control metrics for the subset of resources.

16. The apparatus of clause 15, wherein the processor is further configured to execute the instructions to:

receive, at the first UE, a second congestion control metrics for the subset of resources within the configured search space that are measured by the one or more second UE; and select resources within the subset of resources based in part on one or both of the first congestion control metrics measured by the first UE or the second congestion control metrics measured by the one or more second UE.

17. The apparatus of any of clauses 15 or 16, wherein the first congestion control metrics is one or both of calculating channel busy ratio (CBR) or channel occupancy ratio (CR) for each search space in which the UE may transmit sidelink communications.

18. The apparatus of any of clauses 15-17, wherein the processor configured to execute the instructions to determine the first congestion control metrics for the subset of sub-channel is further configured to execute the instructions to:

determine the first congestion control metric for a first search space from a plurality of search spaces that the first UE is configured for sidelink communication; and determining a second congestion control metric for a second search space from the plurality of search spaces that the first UE is configured for sidelink communication.

19. The apparatus of any of clauses 15-18, wherein the processor configured to execute the instructions to determine the first congestion control metrics for the subset of sub-channel is further configured to execute the instructions to:

determine the first congestion control metric for a first search space from a plurality of search spaces that the first UE is configured for sidelink communication; and determine an average congestion control metric for a plurality of second search spaces from the plurality of search spaces that the first UE is configured for sidelink communication.

20. The apparatus of any of clauses 15-19, wherein the processor configured to execute the instructions to determine the first congestion control metrics for the subset of resources is further configured to execute the instructions to:

determine the search space associated with the one or more second UE; and perform channel sensing for the subset of resources within the one or more search spaces configured for the first UE that overlap at least partially the search space associated with the second UE.

21. The apparatus of any of clauses 15-20, wherein the processor configured to execute the instructions to determine the search space associated with the one or more second UE is further configured to execute the instructions to:

receive search space configuration information from the one or more second UEs; and identify the subset of resources to perform channel sensing based in part on the received search space configuration information.

22. The apparatus of any of clauses 15-19, wherein the processor configured to execute the instructions to determine the search space associated with the one or more second UE is further configured to execute the instructions to:

determine the search space associated with the one or more second UE; and perform channel sensing for the subset of resources that is different from the search space associated with the one or more second UE.

23. The apparatus of any of clauses 15-22, wherein the processor configured to execute the instructions to transmit from the first UE a sidelink data to the one or more second UEs is further configured to execute the instructions to:

receive, at the first UE, anchor-assisted sensing information from at least one anchor UE to assist the first UE in resource selection for transmitting from the first UE the sidelink data to the one or more second UEs comprises.

24. The apparatus of any of clauses 15-23, wherein anchor assistance information includes one or more of channel measurements of the search space, receiver UE congestion control metrics, reference signal received power (RSRP), or received signal strength indicator (RSSI).

25. The apparatus of any of clauses 15-24, wherein the anchor-assisted sensing information is received at the first UE during periodic transmission as a groupcast message.

26. The apparatus of any of clauses 15-25, wherein the anchor-assisted sensing information is received at the first UE during aperiodic transmission based on changes that exceed a threshold for congestion control metrics for the subset of subchannels.

27. The apparatus of any of clauses 15-26, wherein the processor configured to execute the instructions to determine the first congestion control metrics for the subset of resources is further configured to execute the instructions to:

receive, at the first UE, resource information that originates at a third UE and is relayed to the first UE via the one or more second UEs, wherein the resource information is used by the first UE in resource selection for transmitting from the first UE the sidelink data to the one or more second UEs.

28. The apparatus of any of clauses 15-27, wherein the processor configured to execute the instructions to receive the resource information via the one or more second UEs is further configured to execute the instructions to:

configure the one or more second UEs to monitor one or more search spaces associated with a third UE, wherein the one or more second UEs forward the resource information utilized by the third UE to the first UE upon detection of any signals from the third UE.

29. A non-transitory computer readable medium storing instructions, executable by a processor, for wireless communications, comprising instructions for:

configuring, at a first user equipment (UE), a search space for sidelink communication with one or more second UEs, wherein the search space is a subset of resources from a resource pool;

determining, at the first UE, first congestion control metrics for the subset of resources within the configured search space prior to initiating data transmission from the first UE to the one or more second UEs; and transmitting from the first UE a sidelink data to the one or more second UEs over the subset of resources within the search space based on the first congestion control metrics for the subset of resources.

30. An apparatus for wireless communications, comprising:

means for configuring, at a first user equipment (UE), a search space for sidelink communication with one or more second UEs, wherein the search space is a subset of resources from a resource pool;

means for determining, at the first UE, first congestion control metrics for the subset of resources within the configured search space prior to initiating data transmission from the first UE to the one or more second UEs; and means for transmitting from the first UE a sidelink data to the one or more second UEs over the subset of resources within the search space based on the first congestion control metrics for the subset of resources.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
configuring, at a first user equipment (UE), a first search space for sidelink communication with one or more second UEs, wherein the first search space is a subset of resources from a resource pool;
receiving, at the first UE, resource information that originates at a third UE and is relayed to the first UE via the one or more second UEs, wherein the resource information is used by the first UE in resource selection for transmitting from the first UE sidelink data to the one or more second UEs; and
transmitting from the first UE the sidelink data to the one or more second UEs over the subset of resources within the first search space based, at least in part, on the resource information, wherein the first UE identifies a first congestion control metrics for the subset of resources within the configured first search space prior to initiating data transmission from the first UE to the one or more second UEs.

2. The method of claim 1, further comprising:
receiving, at the first UE, a second congestion control metrics for the subset of resources within the configured first search space that are measured by the one or more second UE; and
selecting resources within the subset of resources based in part on one or both of the first congestion control metrics measured by the first UE or the second congestion control metrics measured by the one or more second UE.

3. The method of claim 1, wherein the first congestion control metrics is one or both of calculating channel busy ratio (CBR) or channel occupancy ratio (CR) for each search space in which the UE may transmit sidelink communications.

4. The method of claim 1, wherein the first congestion control metrics for the subset of resources within the configured first search space prior to initiating data transmission from the first UE to the one or more second UEs is measured based, in part, on:
determining the first congestion control metric for a first search space from a plurality of search spaces that the first UE is configured for sidelink communication; and
determining a second congestion control metric for a second search space from the plurality of search spaces that the first UE is configured for sidelink communication.

5. The method of claim 1, wherein the first congestion control metrics for the subset of resources within the configured first search space prior to initiating data transmission from the first UE to the one or more second UEs is measured based, in part, on:
determining the first congestion control metric for a first search space from a plurality of search spaces that the first UE is configured for sidelink communication; and
determining an average congestion control metric for a plurality of second search spaces from the plurality of search spaces that the first UE is configured for sidelink communication.

6. The method of claim 1, wherein the first congestion control metrics for the subset of resources within the configured first search space are based in part on performing channel sensing on the subset of resources within the first search space configured for the first UE for sidelink communication with the one or more second UEs that overlap at least partially with a second search space associated with the one or more second UEs.

7. The method of claim 1, wherein the first search space associated with the one or more second UE is determined based, in part, on: receiving search space configuration information from the one or more second UEs; and identifying the subset of resources to perform channel sensing based in part on the received search space configuration information.

8. The method of claim 1, wherein the first congestion control metrics for the subset of resources are measured based, in part, on: identifying a second search space associated with the one or more second UE; and performing channel sensing for the subset of resources that is different from the second search space associated with the one or more second UE.

9. The method of claim 1, wherein transmitting from the first UE a sidelink data to the one or more second UEs comprises:
receiving, at the first UE, anchor-assisted sensing information from at least one anchor UE to assist the first UE in resource selection for transmitting from the first UE the sidelink data to the one or more second UEs.

10. The method of claim 9, wherein anchor assistance information includes one or more of channel measurements of the first search space, receiver UE congestion control metrics, reference signal received power (RSRP), or received signal strength indicator (RSSI).

11. The method of claim 9, wherein the anchor-assisted sensing information is received at the first UE during periodic transmission as a groupcast message.

12. The method of claim 9, wherein the anchor-assisted sensing information is received at the first UE during aperiodic transmission based on changes that exceed a threshold for congestion control metrics for the subset of subchannels.

13. The method of claim 1, wherein receiving the resource information via the one or more second UEs comprises:
configuring the one or more second UEs to monitor one or more search spaces associated with a third UE, wherein the one or more second UEs forward the resource information utilized by the third UE to the first UE upon detection of any signals from the third UE.

14. An apparatus for wireless communications, comprising:
at least one processor;
and memory coupled to the at least one processor, the memory including instructions executable by the at least one processor to cause the apparatus to:
configure, at a first user equipment (UE), a first search space for sidelink communication with one or more second UEs, wherein the first search space is a subset of resources from a resource pool;
receive, at the first UE, resource information that originates at a third UE and is relayed to the first UE via the one or more second UEs, wherein the resource information is used by the first UE in resource selection for transmitting from the first UE the sidelink data to the one or more second UEs; and transmit from the first UE the sidelink data to the one or more second UEs over the subset of resources within the first search space based, at least in part, on the resource information, wherein the first UE identifies a first congestion control metrics for the subset of resources within the configured first search space prior to initiating data transmission from the first UE to the one or more second UEs.

15. The apparatus of claim 14, wherein the processor is further configured to execute the instructions to:
receive, at the first UE, a second congestion control metrics for the subset of resources within the configured first search space that are measured by the one or more second UE; and
select resources within the subset of resources based in part on one or both of the first congestion control metrics measured by the first UE or the second congestion control metrics measured by the one or more second UE.

16. The apparatus of claim 14, wherein the first congestion control metrics is one or both of calculating channel busy ratio (CBR) or channel occupancy ratio (CR) for each search space in which the UE may transmit sidelink communications.

17. The apparatus of claim 14, wherein the first congestion control metrics for the subset of resources is measured based, in part, by the processor further configured to execute the instructions to: determine the first congestion control metric for the first search space from a plurality of search spaces that the first UE is configured for sidelink communication; and determining a second congestion control metric for a second search space from the plurality of search spaces that the first UE is configured for sidelink communication.

18. The apparatus of claim 14, wherein the first congestion control metrics for the subset of resources is measured based, in part, by the processor further configured to execute the instructions to: determine the first congestion control metric for the first search space from a plurality of search spaces that the first UE is configured for sidelink communication; and determine an average congestion control metric for a plurality of second search spaces from the plurality of search spaces that the first UE is configured for sidelink communication.

19. The apparatus of claim 14, wherein the first congestion control metrics for the subset of resources within the configured first search space are based in part on performing channel sensing on the subset of resources within the first search space configured for the first UE for sidelink communication with the one or more second UEs that overlap at least partially with a second search space associated with the one or more second UEs.

20. The apparatus of claim 14, wherein the the search space associated with the one or more second UE is determined by the processor further configured to execute the instructions to:
receive search space configuration information from the one or more second UEs; and
identify the subset of resources to perform channel sensing based in part on the received search space configuration information.

21. The apparatus of claim 14, wherein the first search space associated with the one or more second UE is determined by the processor further configured to execute the instructions to: identify a second search space associated with the one or more second UE; and perform channel sensing for the subset of resources that is different from the second search space associated with the one or more second UE.

22. The apparatus of claim 14, wherein the processor configured to execute the instructions to transmit from the first UE a sidelink data to the one or more second UEs is further configured to execute the instructions to:
receive, at the first UE, anchor-assisted sensing information from at least one anchor UE to assist the first UE in resource selection for transmitted from the UE the sidelink data to the one or more second UEs.

23. The apparatus of claim 22, wherein anchor assistance information includes one or more of channel measurements of the first search space, receiver UE congestion control metrics, reference signal received power (RSRP), or received signal strength indicator (RSSI).

24. The apparatus of claim 22, wherein the anchor-assisted sensing information is received at the first UE during periodic transmission as a groupcast message.

25. The apparatus of claim 22, wherein the anchor-assisted sensing information is received at the first UE during aperiodic transmission based on changes that exceed a threshold for congestion control metrics for the subset of resources.

26. The apparatus of claim 14, wherein the processor configured to execute the instructions to receive the resource information via the one or more second UEs is further configured to execute the instructions to:
configure the one or more second UEs to monitor one or more search spaces associated with a third UE, wherein the one or more second UEs forward the resource information utilized by the third UE to the first UE upon detection of any signals from the third UE.

27. A non-transitory computer readable medium storing instructions, executable by a processor, for wireless communications, comprising instructions for:
configuring, at a first user equipment (UE), a first search space for sidelink communication with one or more second UEs, wherein the first search space is a subset of resources from a resource pool;
receiving, at the first UE, resource information that originates at a third UE and is relayed to the first UE via the one or more second UEs, wherein the resource information is used by the first UE in resource selection for transmitting from the first UE sidelink data to the one or more second UEs; and
transmitting from the first UE the sidelink data to the one or more second UEs over the subset of resources within the first search space based, at least in part, on the resource information, wherein the first UE identifies a first congestion control metrics for the subset of resources within the configured first search space prior to initiating data transmission from the first UE to the one or more second UEs.

28. An apparatus for wireless communications, comprising:
means for configuring, at a first user equipment (UE), a first search space for sidelink communication with one or more second UEs, wherein the first search space is a subset of resources from a resource pool;
means for receiving, at the first UE, resource information that originates at a third UE and is relayed to the first UE via the one or more second UEs, wherein the resource information is used by the first UE in resource selection for transmitting from the first UE sidelink data to the one or more second UEs; and means for transmitting from the first UE the sidelink data to the one or more second UEs over the subset of resources within the first search space based, at least in part, on the resource information, wherein the first UE identifies a first congestion control metrics for the subset of resources within the configured first search space prior to initiating data transmission from the first UE to the one or more second UEs.

* * * * *